E. M. LEWIS.
PROCESS OF MANUFACTURING BICYCLE FORKS.
APPLICATION FILED SEPT. 2, 1919.
1,378,041.
Patented May 17, 1921.
3 SHEETS—SHEET 1.
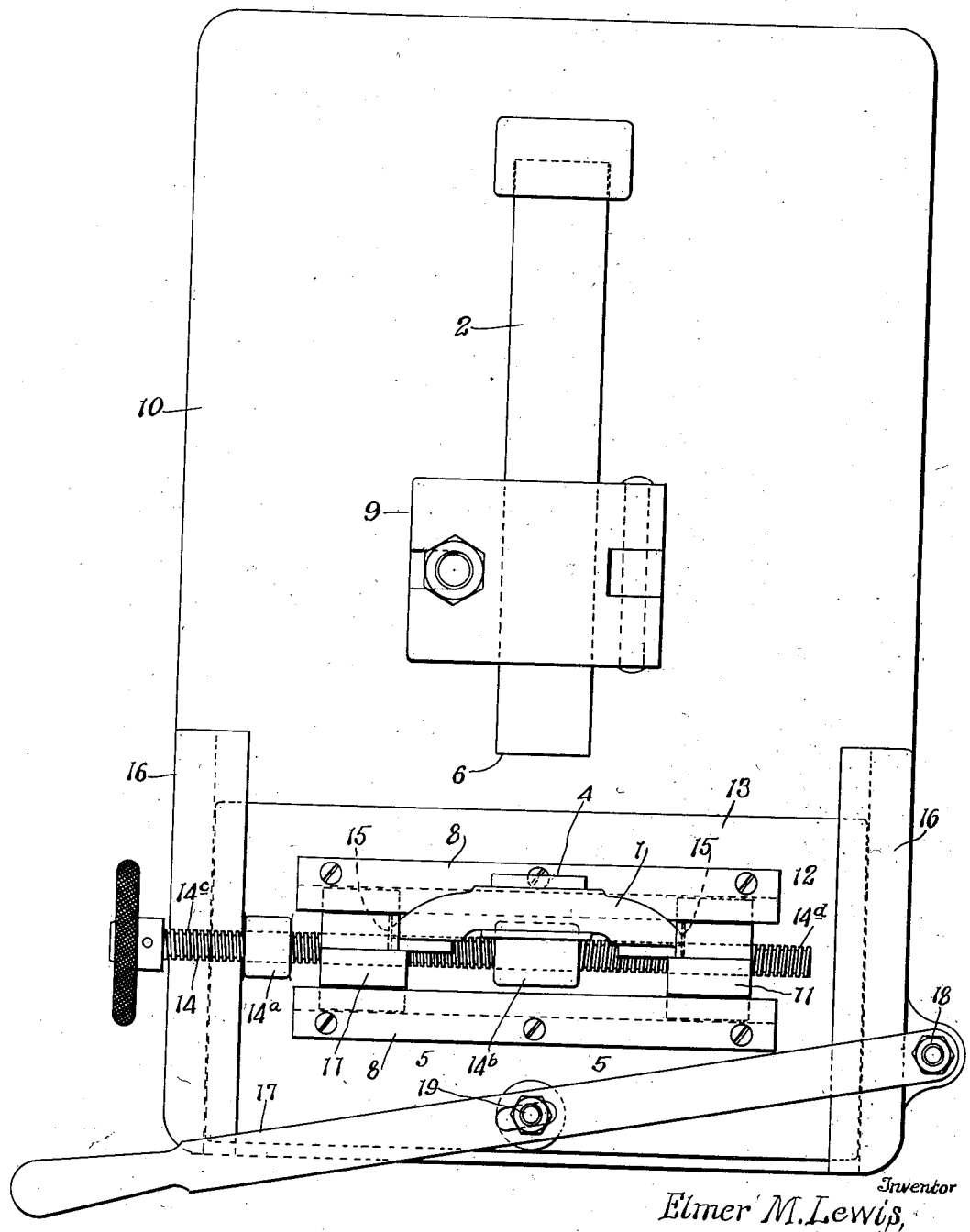
Inventor
Elmer M. Lewis,
By Toulmin & Toulmin,
Attorneys

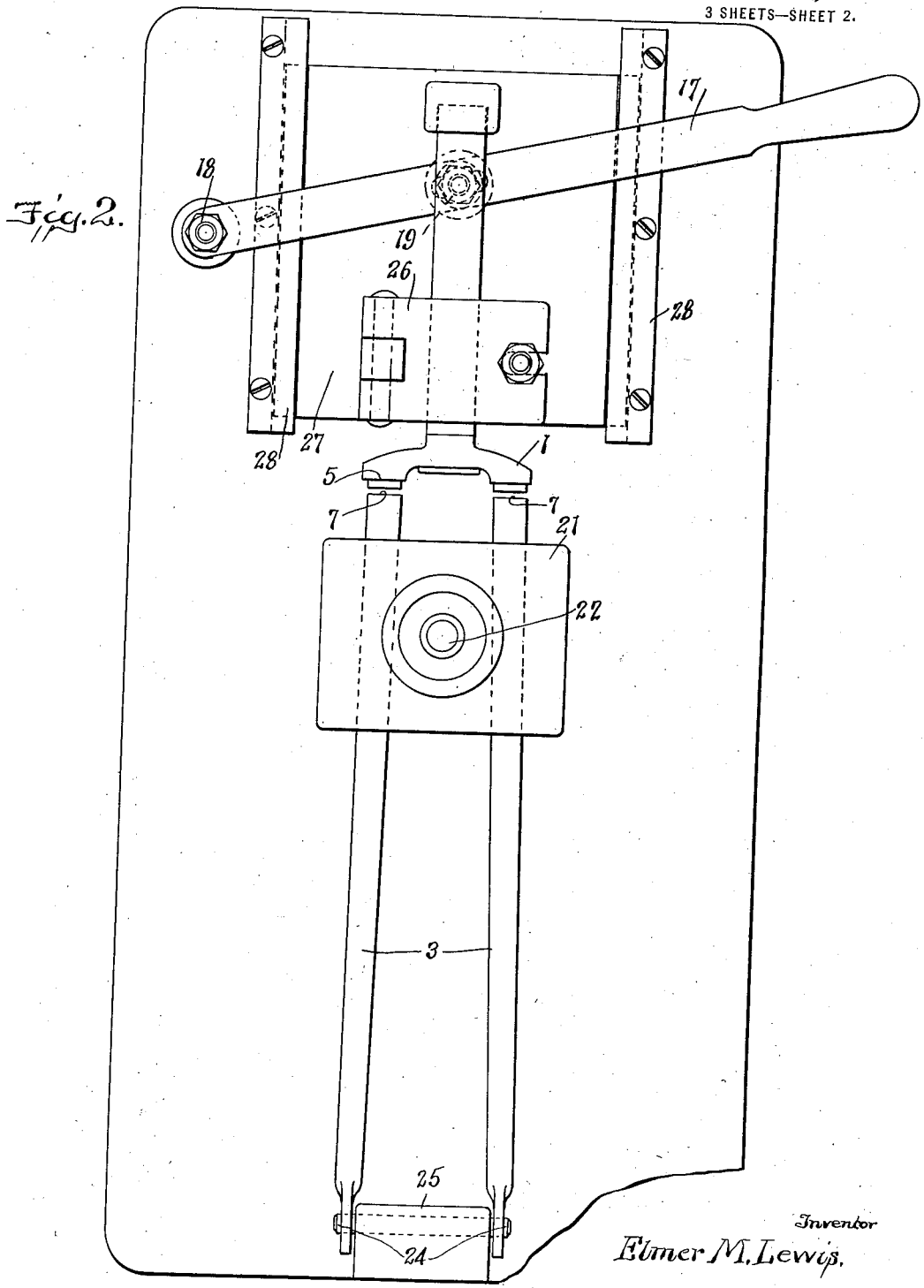

E. M. LEWIS.
PROCESS OF MANUFACTURING BICYCLE FORKS.
APPLICATION FILED SEPT. 2, 1919.
1,378,041.
Patented May 17, 1921.
3 SHEETS—SHEET 3.
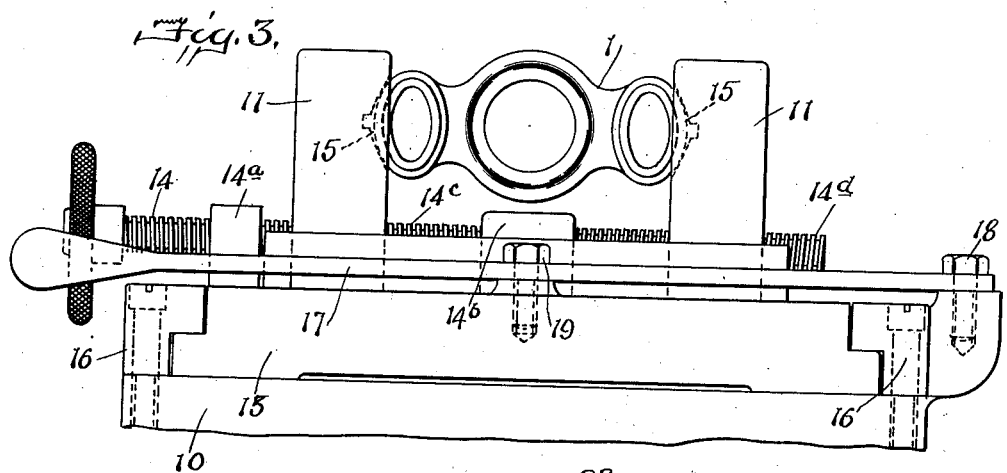
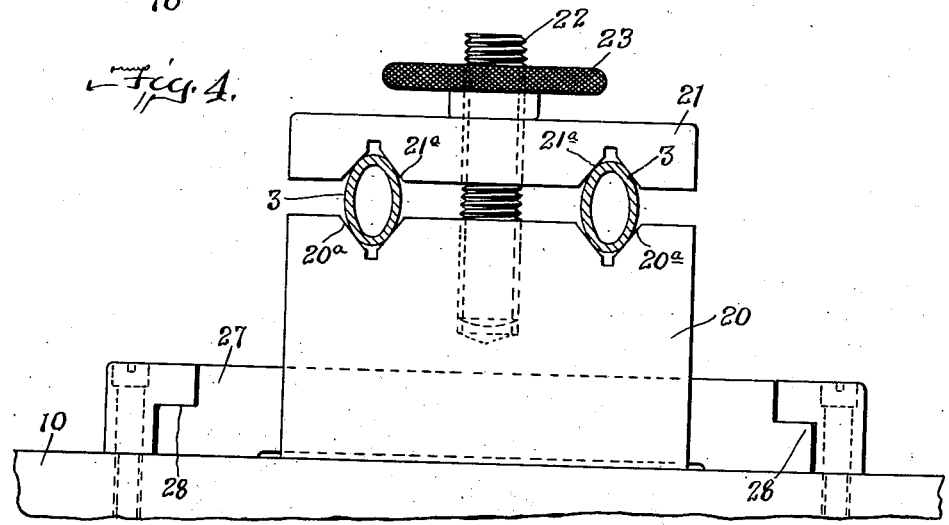
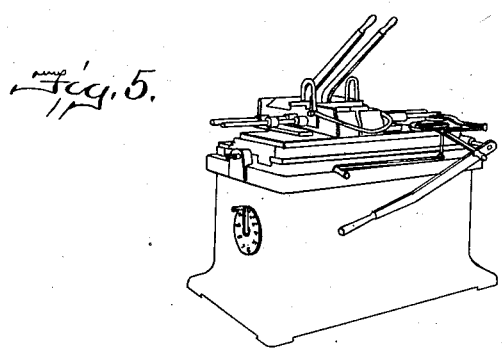
Inventor
Elmer M. Lewis,
By Toulmin & Toulmin,
Attorneys

UNITED STATES PATENT OFFICE.

ELMER M. LEWIS, OF DAYTON, OHIO, ASSIGNOR TO THE DAVIS SEWING MACHINE COMPANY, OF DAYTON, OHIO, A CORPORATION OF OHIO.

PROCESS OF MANUFACTURING BICYCLE-FORKS.

1,378,041.  Specification of Letters Patent.  Patented May 17, 1921.

Application filed September 2, 1919. Serial No. 321,176.

*To all whom it may concern:*

Be it known that I, ELMER M. LEWIS, a citizen of the United States, residing at Dayton, in the county of Montgomery and State of Ohio, have invented certain new and useful Improvements in Processes of Manufacturing Bicycle-Forks, of which the following is a specification, reference being had therein to the accompanying drawings.

This invention relates to an improved process of manufacturing relating to the production of bicycles, specifically to the manufacturing of bicycle front forks.

The main object of the invention is to simplify and cheapen the successive steps or processes of manufacturing and to improve the product, these objects being realized in the practice of my new process of manufacturing as herein described.

In the manufacturing of bicycle forks, it has been common practice heretofore to assemble the various parts consisting of the opposite forks, fork head and fork stem comprised in the complete fork, by dip-brazing the parts together into an integral unit of the bicycle frame. This method involved numerous operations, such as drilling, turning and profiling the fork head, which usually consists of a drop forging, machining the butt-ends of the forks to fit the same to the reinforcing projections of the fork head, and pinning and dip-brazing the joints. In like manner the fork stem is brazed to the fork head. The rough brazed joints thus formed require pickling, stripping, filing and scraping operations to reduce the joints to finished dimensions, the work being finished by a strapping operation to remove the scale and other burnt materials remaining thereon from the brazing operation, and to smooth and polish the parts prior to enameling the same for the finished frame.

The present invention relates to a new process of butt-welding, as applied to bicycle manufacturing, and as distinguished from the old practice of dip brazing. In the new process numerous operations of the old method are eliminated, and others are simplified, the construction of the fork as a whole being greatly simplified and cheapened notwithstanding that a much neater and better job is made by the butt-welding process.

The new process as herein described may be practised on any suitable welding machine equipped with any suitable fixtures to properly support the separate pieces of the forks to be welded together in the required relation to each other, one of the parts, preferably, being held in a fixed relation to the machine while the other part is held in a fixture adapted to move the same relative to the fixed part to effect a butt-welded operation to join the parts together.

A problem involved in the manufacture of bicycle forks and solved by the present invention consists in properly alining the parts relative to each other preceding the formation of the joints by which the parts are united. Under the old practice of dip-brazing this was at best difficult and uniformity in the operations could not be maintained. In the practice of my new process, however, the alinement of the parts is effectually accomplished by the alining fixtures with which the welding apparatus is equipped, thus effecting uniformity of alinement of the parts and of joint formation in the product.

The invention has the further advantage of rendering unnecessary the use of reinforcings at the junctures between the fork head and stem and the opposite fork members, thus effecting a lighter and cheaper construction without sacrifice of strength.

In the accompanying drawings an arrangement is shown for practising my improved process in one form, the details of the arrangement being shown for illustration purposes only, and it will be understood from the herein detailed description that the process may be practised with any suitable welding apparatus equipped with any suitable fixtures for handling the work.

The bicycle fork as here shown comprises the subject matter of a copending application for Letters Patent and is shown in connection with the apparatus for the purposes of illustration, it being understood that forks of any of the usual well known types may be manufactured under the new process.

Referring to the drawings:

Figure 1 represents a plan of the work-supporting table of a welding machine, the work-alining fixtures thereon and the first step of the butt-welding operation as practised by my new process;

Fig. 2 is a plan view of the welding apparatus illustrated in Fig. 1, equipped with a different set of work holding fixtures and illustrating the second step of the butt-welding operations to complete the fork;

Figs. 3 and 4 are detail views illustrating features of construction of the work fixtures;

Fig. 5 is a perspective view of a general type of welding apparatus upon which my process may be practised.

The first step in the practice of my new process consists in preparing the several parts of the bicycle fork before the same are welded together for the butt-welding operation. This consists in providing the fork head, the opposite forks and the stem, respectively, with suitable contact surfaces to form the butt-weld joints. This preparation is described in detail in one preferred form of my copending application, Ser. No. 321,175, filed of even date herewith, above referred to, and is further shown in the drawings herewith in its general form for the purposes of illustrating the invention.

As shown in Figs. 1 and 2 of the drawings the several units, which are welded together, are fork head 1, fork stem 2, and the opposite fork members 3—3. These parts are provided, respectively, with contact surfaces 4, 5—5, 6 and 7—7, the opposite surfaces being brought together and butt-welded in the process of constructing the fork.

The second step of the process, as here shown, consists in alining the fork head and stem in suitable fixtures 8 and 9, respectively, arranged on the supporting table 10 of the welding apparatus, such an arrangement in one preferred form being shown in Fig. 1 of the drawings. It will be understood, however, that any suitable welding apparatus and alining fixtures may be employed in the practice of this process, such an apparatus of a general commercial type being shown in Fig. 6 of the drawings.

As best shown in Fig. 3, the alining fixture 8 consists of two opposite jaws 11—11 which are screw-threaded and slidably supported in ways 12—12 of a base block 13, the jaws 11—11 being adjustable relatively to each other by means of a screw 14 supported in bearings 14$^a$ and 14$^b$ of the sliding plate 13, and having right and left hand threads 14$^c$ and 14$^d$ which coöperate with the threaded apertures of the blocks to move them one toward the other to support and aline the fork head therebetween, the ends 15—15 of the fork head being machined to accurate dimensions whereby to properly aline the fork head between the jaws and with the fork stem 2. The base block 13 is slidably supported upon the table 10 in ways 16—16 which are secured to the table in any suitable manner and serve to guide the base 13 and the work carried thereby in a longitudinal movement over the table. Thus the surface 4 of the fork head may be brought to contact with the surface 6 of the stem 2 to effect the weld. As here shown a lever 17 pivoted to the table 10, as shown at 18, and fulcrumed on the plate 13, as shown at 19, may be employed to actuate the plate 13.

The fork stem 2 is supported in the fixture 9 which may be secured to the table 10 in any suitable manner. This fixture may be of any suitable construction. In a preferred form here shown the fixture consists of a base block secured to the table 10 having an alining and holding plate hinged thereto in the usual construction of jig fixtures. Between the plates of the fixture a suitable aperture is provided to receive the fork stem and aline the same relative to the contact portion 4 of the fork head, the stem being held in fixed or stationary relation relative to the bed 10 while the fork head is moved into contact therewith to form a butt-weld joint, the electrical current being passed through the opposite parts in any suitable manner to cause fusing of the metal in the usual manner of effecting welding operations.

The third and final step of the process consists in welding the opposite forks 3—3 to the sub-assembly formed in the second step of the operation, that is to say the sub-assembly consisting of the fork-head and stem. As here shown the forks are held in fixed relation to the bed 10 by a suitable supporting and alining fixture which as here shown consists of a supporting base 20 having opposite angular jaws 20$^a$ formed therein to receive the forks 3—3. A securing and alining block 21 having jaws 21$^a$ is adjustably secured to the block 20 by a threaded stem 22 and an adjusting nut 23. Thus the forks 3—3 are held in fixed relation to the bed 10 and in alined relation to the fork head by the fixture, the free ends of the fork being supported by pins 24—24 supported in a bracket 25 secured to the table 10, the pins 24 also aiding in alining the forks.

The assembled fork head and stem are supported in a supporting and alining fixture consisting, as here shown, of a clamp and liner block 26 secured to a base plate 27 which slides in ways 28—28 secured to the table 10, the plate 27 being actuated by the hand lever 17 which may be adapted to either of the fixtures used in the second and third steps of the process. Thus it will be seen the contact surfaces 5—5 and 7—7 may be brought together to effect the welding operation.

From the foregoing detailed description the successive steps of my improved process will be readily understood. To accomplish the most effective butt-welding in the practice of this process the opposite contact surfaces 5—5 and 7—7 and 4 and 6 should be of substantially equal surface exposure and conform to each other. This causes equal fusing of the metal of the opposite parts and results in close uniformity in the work.

It will be understood, of course, the various modifications may be made in the form of fixtures used for holding and alining the several parts and in the order of the operations in the practice of this process without departing from the principles and purposes of the invention.

Having thus fully described my invention, what I claim as new and desire to secure by Letters Patent, is:—

1. In the manufacture of bicycles the herein described process consisting in supporting and alining a bicycle fork head having a weld contact surface, in supporting and alining relative to said head a fork stem having a corresponding weld contact surface, and in causing said surfaces to be brought into contact and in the application of a welding heat to the contacting parts to effect a butt-weld therebetween.

2. In the manufacture of bicycles the herein described process consisting in supporting and alining a bicycle fork head and stem sub-assembly having a plurality of weld contact surfaces, in supporting and alining relative to said sub-assembly the opposite fork members each having a weld contact surface corresponding to one of said plurality of contact surfaces, and in causing said surfaces to be brought into contact and in the application of a welding heat to the contacting parts to effect a butt-weld therebetween.

3. In the manufacture of bicycles the herein described process consisting in providing the separate parts of a bicycle fork with a suitable contact surface to effect a butt-weld with the corresponding weld surface of the part to be welded thereto, said opposite weld surfaces corresponding substantially one with the other in surface outline and area, in supporting and alining said parts relative to each other and in the application of a welding heat to them so as by successive butt-welding operations to construct an integral fork thereof.

In testimony whereof I affix my signature.

ELMER M. LEWIS.